(12) United States Patent
Fox

(10) Patent No.: US 6,640,491 B1
(45) Date of Patent: Nov. 4, 2003

(54) GARDENING DEVICE

(76) Inventor: John Gregory Fox, 2976 99th St., Urbandale, IA (US) 50322

( * ) Notice: Subject to any disclaimer, the term of this patent is extended or adjusted under 35 U.S.C. 154(b) by 0 days.

(21) Appl. No.: 10/269,642

(22) Filed: Oct. 11, 2002

(51) Int. Cl.[7] .............................................. A01G 13/02
(52) U.S. Cl. ...................................................... 47/23.3
(58) Field of Search ....................... 47/23.3, 2, 62 R

(56) References Cited

U.S. PATENT DOCUMENTS

| | | | | |
|---|---|---|---|---|
| 676,201 A | * | 6/1901 | Patric | 47/23.3 |
| 1,126,426 A | * | 1/1915 | Eddy | 47/23.2 |
| 1,442,367 A | * | 1/1923 | Stevens | 47/1.01 R |
| 1,846,395 A | | 2/1932 | Huffaker | |
| 2,006,562 A | | 7/1935 | Scheu | |
| 2,953,870 A | | 9/1960 | Nelson | |
| 3,095,670 A | | 7/1963 | Raab | |
| 3,890,740 A | * | 6/1975 | Miller | 47/1.01 R |
| 4,087,938 A | * | 5/1978 | Koch | 47/48.5 |
| 4,114,620 A | * | 9/1978 | Moore et al. | 607/104 |
| 4,125,963 A | | 11/1978 | Johnson | |
| 4,137,667 A | | 2/1979 | Wallace et al. | |
| 4,233,779 A | * | 11/1980 | Griffith | 47/29.5 |
| 4,267,665 A | * | 5/1981 | Wallace et al. | 47/29.1 |
| 4,279,291 A | * | 7/1981 | Lambert | 165/45 |
| 4,495,723 A | * | 1/1985 | Wasserman | 47/2 |
| 4,614,055 A | * | 9/1986 | Day | 47/2 |
| 4,631,861 A | * | 12/1986 | Wuthrich | 47/70 |
| 4,642,938 A | | 2/1987 | Georges et al. | |
| 4,651,465 A | | 3/1987 | Lilly | |
| 4,741,388 A | * | 5/1988 | Kuroiwa | 165/45 |
| 4,821,453 A | * | 4/1989 | Morehead | 47/2 |
| 4,841,670 A | * | 6/1989 | Bitter | 47/47 |
| 4,901,472 A | * | 2/1990 | Donohue et al. | 47/2 |
| 5,433,759 A | * | 7/1995 | Benson | 47/1.01 R |
| D366,401 S | | 1/1996 | Smith | |
| 5,575,109 A | | 11/1996 | Kuntz | |
| 5,671,562 A | * | 9/1997 | Fah | 47/79 |
| 6,012,249 A | * | 1/2000 | Cheney | 47/29.2 |
| 6,218,184 B1 | * | 4/2001 | Hasegawa et al. | 435/431 |

* cited by examiner

Primary Examiner—Charles T. Jordan
(74) Attorney, Agent, or Firm—McKee, Voorhees & Sease, P.L.C.

(57) ABSTRACT

A device and method are disclosed for protecting plants from cold weather damage. A transparent, fluid-filled enclosure encircles a plant above the ground. A heater warms the fluid, which in turn warms the plant.

16 Claims, 2 Drawing Sheets

GARDENING DEVICE

FIELD OF THE INVENTION

This invention relates to a device and method for protecting plants from cold weather.

BACKGROUND OF THE INVENTION

Many plants, such as tomatoes, have growing seasons shortened by cold weather, thus lessening food production. These plants can be started or grown in greenhouses, but this is expensive.

Various types of outdoor plant heaters exist. Smudge pots burn oil to warm plants, such as citrus trees. However, the use of smudge pots is unsatisfactory. Hot air and combustion products rise rapidly from the level of the plants, especially if there is a wind, and soot is produced during combustion.

Other plant heaters spray warm water over plants, but this can lead to over-watering and requires a continuous water source. Still other heaters circulate warm ground water through a thermal barrier adjacent to a plant before spraying the water over the plant or directly onto the ground.

Still other plant heaters employ vented, transparent plastic covers to enclose plants, but have no active heating element, relying instead on unpredictable and intermittent sunshine, and do not warm the roots of the plant.

U.S. Pat. No. 4,137,667 teaches a method of protecting a plant from cold weather by interposing a water layer enclosed in transparent plastic between the plant and the outside atmosphere. However, the device does not include a heater to prevent the water from freezing, nor a means for heating the roots of the plant.

U.S. Pat. No. 5,575,109 teaches a plant protection device with a double-walled enclosure. However, the portion of the device extending above the ground is single-walled and there is no disclosure of heated fluid within the double-walled portion of the enclosure.

In summary, while other plant heaters exist, no one has developed a gardening device or method that warms a plant by surrounding it with a double-walled container full of fluid warmed by a heater, yet does not require a continuous water source.

The primary objective of this invention is to fulfill the above described need with a new gardening device consisting of a double-walled enclosure, adapted for filling with fluid, of a size sufficient to completely encircle a plant, fluid filling the double-walled enclosure and a heater operatively connected to a wall of the enclosure for heating the fluid within the double-walled enclosure.

A further object of the present invention is the provision of a method for keeping a plant warm.

These and other objects, features and/or advantages of the present invention will become apparent from the specification and claims.

SUMMARY OF THE INVENTION

The foregoing objects may be achieved by a device comprising a double-walled enclosure, adapted for filling with fluid, of a size sufficient to encircle a plant, fluid filling the double-walled enclosure and a heater operatively connected to the wall of the enclosure.

According to another feature of the invention, the device includes an elongated heating member extending from above ground to a determined depth below ground, and a second heater connected to and causing heating of the elongated heating member.

According to another feature of the invention, the device includes a vented lid removably mounted to the top of the double-walled enclosure.

According to another feature of the invention, the device includes a trellis removably mounted to the double-walled enclosure for supporting a plant growing above the double-walled enclosure.

According to another feature of the invention, the device includes a cover surrounding the trellis.

According to another feature of the invention, the device includes a fluid circulation pump for circulating fluid within the double-walled enclosure.

The method of the present invention comprises positioning a double-walled enclosure around a plant and adjustably heating the fluid to maintain the plant above a critical temperature.

According to another feature of the invention, the method includes positioning a heating member underground near the roots of the plant, and applying heat to the heating member.

According to another feature of the invention, the method includes positioning a vented lid on top of the enclosure.

According to another feature of the invention, the method includes positioning a trellis on top of the enclosure.

According to another feature of the invention, the method includes positioning a cover around or over the trellis.

DETAILED DESCRIPTION OF THE PREFERRED EMBODIMENT

Figure 1:
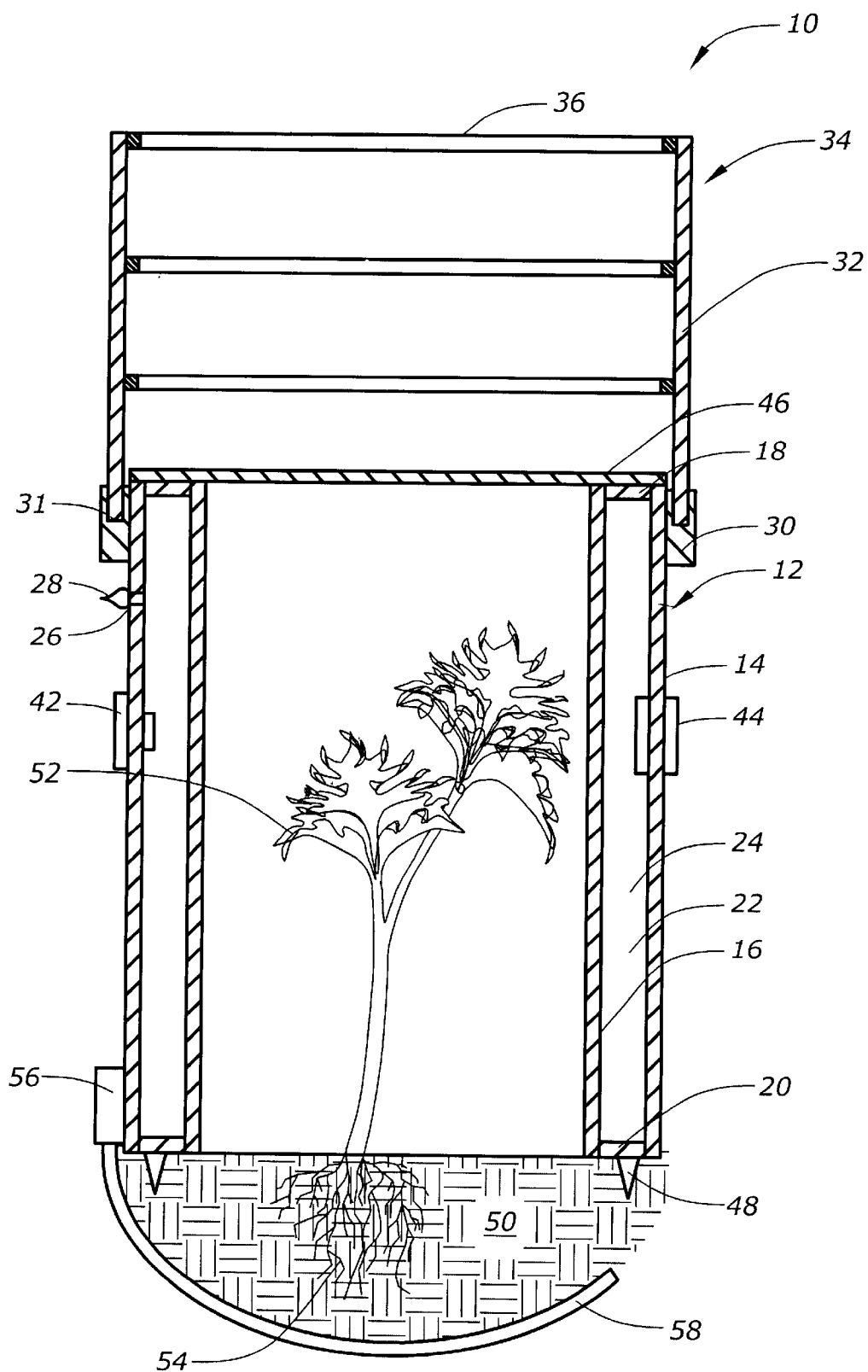
FIG. 1 is a sectional view of a gardening device.
Figure 2:
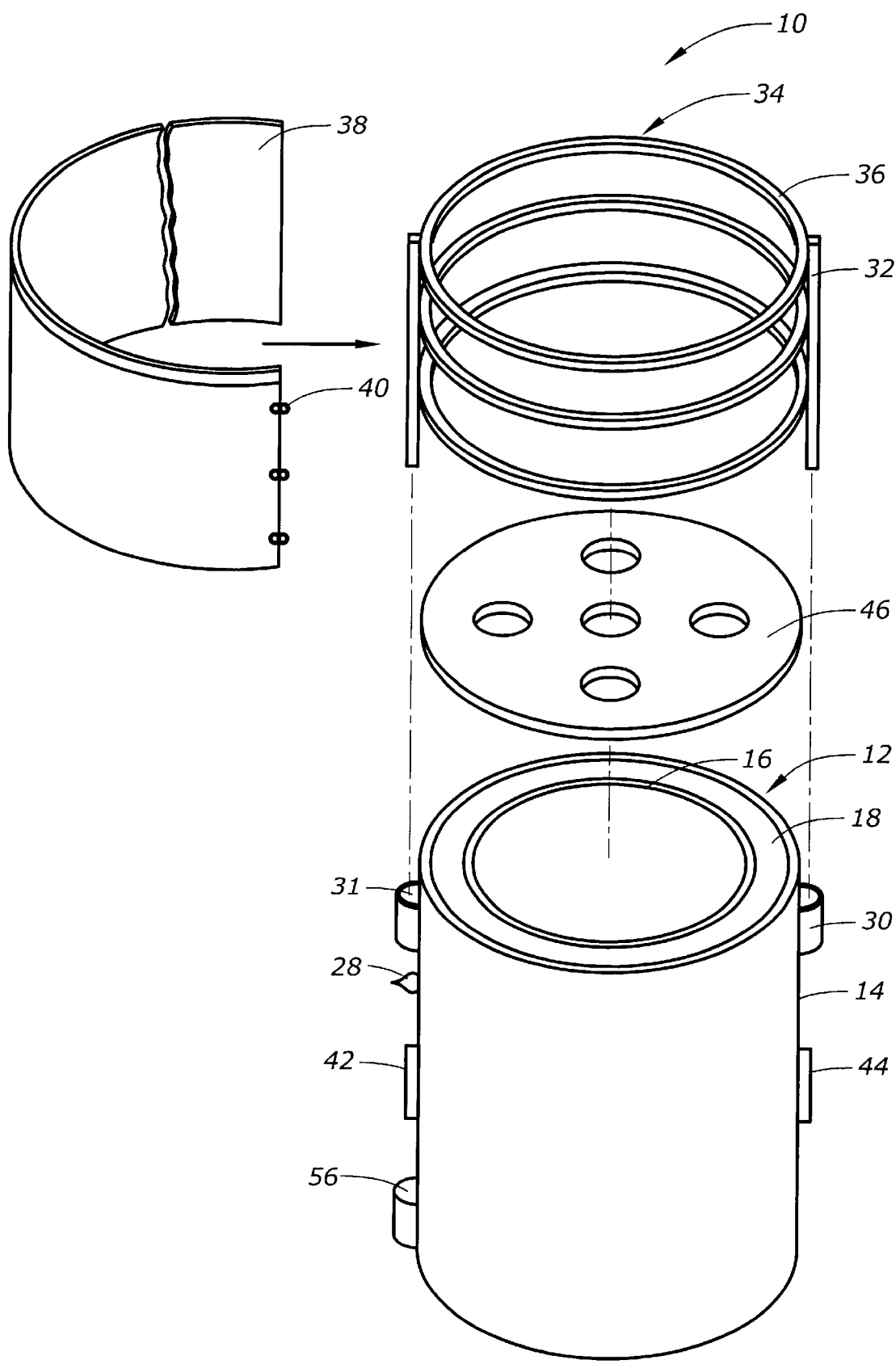
FIG. 2 is an exploded view of the gardening device.

Referring to FIGS. 1 and 2, 10 designates a gardening device.

A double-walled enclosure 12 includes an outer wall 14, an inner wall 16, a top wall 18 and a bottom wall 20. The double walled enclosure 12 may be made of any suitable material such as plastic. The walls define an annular space 22. The walls may be opaque, translucent or, preferably, transparent. The annular space is filled with fluid 24 through a fill hole 26 that is sealed with a cap 28. The fluid 24 may be water, but aqueous solutions and other fluids may be used.

Pockets 30 attach to the outer wall 14 and include receptacles 31 which removably receive and support vertical members 32 of the trellis 34. The trellis 34 may be made of any suitable material such as plastic, wood or metal. Horizontal members 36 of the trellis 34 connect the vertical members 32. While the trellis 34 is shown to be cylindrical, it may also lie in a single plane or be square, or any other enclosed shape that forms a cage for containing the plant being grown. A plastic cover 38 is cylindrical in shape and fits around the trellis 34 and is fastened with fasteners 40. The plastic cover 38 may be opaque, translucent or, preferably, transparent. The fasteners 40 may be hook and loop fasteners.

A first heater 42 and circulation pump 44 attach to the outer wall 14. The first heater 42 may be an electric heater. Heater 42 is shown with a heating element inside annular space 22, but it is also possible to place the heater totally outside the outer wall 14. Furthermore, the heater 42 may be placed inside the inner wall 16. When placed inside inner wall 16 it may be either totally inside inner wall 16 or it may have a heating element positioned inside annular space 22. The circulation pump 44 may be an electric circulation pump. A removable, vented lid 46 attaches to the top wall 18. The vented lid 46 may be made out of any suitable material such as plastic and may be opaque or, preferably, transparent.

Stakes 48 may optionally be attached to the bottom wall 20 for fastening the enclosure to the ground 50. The stakes 48 may be made of any suitable material such as plastic, wood or metal. The top of a plant 52 sits inside the cylindrical space defined by the inner wall 16. The roots of the plant 54 sit beneath the ground 50 under the top of the plant 52.

A second heater 56 attaches to the outer wall 14. The second heater 56 may be an electrical heater. Attached to the second heater 56 is an elongated heating member 58 buried in the ground 50 near the roots of the plant 54. It is possible to eliminate second heater 56 and instead mount heating member on outer wall 14 or inner wall 16 in such a manner that it conducts heat from the heated water through the walls 16 or 14 to heat the soil beneath roots 54.

A gardener can employ the gardening device 10 early in a growing season to get a head start on a garden. After planting a seed or plant outdoors, the gardener can encircle the seed or plant with the double-walled enclosure 12. The stakes 48 anchor the double-walled enclosure 12 to the ground. The gardener can then fill the double-walled enclosure 12, through the fill hole 26, with water, an aqueous solution or other fluid 24 and cap the fill hole with the cap 28. The gardener can heat the fluid 24 by adjusting the first heater 42 that is operatively connected to the double-walled enclosure 12. The heated fluid 24, in turn, warms the plant. The gardening device 10 optionally includes the circulation pump 44 to circulate the warmed fluid from the first heater 42 to all through the annular space 22.

Once the double-walled enclosure 12 is around the plant, such as a tomato plant, the gardener can optionally pile dirt inside the enclosure around the stem of the plant to root up the stem. Optionally, the garden device 10 includes the second heater 56 connected to and causing heating of the elongated heating member 58. The gardener can bury the elongated heating member 58 in the ground 50 to warm the roots of the plant 54.

The drawings show the double walled structure 12 resting on the upper surface of the soil 50, but it is also possible to excavate soil 50 and bury the lower end of double walled structure several inches in the soil 50. This will further stabilize device 10 and will also impart heat to the top several inches of soil 50.

The gardening device optionally includes the vented lid 46 removably mounted to the top of the double-walled enclosure 12. The vented lid 46 helps to retain heat around the plant, yet allows some air-circulation. Once the plant has grown sufficiently, the gardener can remove the vented lid 46 from the top of the double-walled enclosure and, optionally, mount the trellis 34 into the receptacles 31 to support the plant in growing above the double-walled enclosure 12.

The double-walled enclosure 12 and vented lid 46 are both preferably transparent to let the sun shine in onto the plant.

Late in the growing season, the gardener can turn on the first heater 42 and/or second heater 56 again and wrap the trellis 34 with the plastic cover 38. The gardener can even warm adjacent plants by placing a tarp over the entire gardening device 10 and adjacent plants. The warmth from the first heater 42 and/or second heater 56 is then distributed to all plants under the tarp.

The gardener may reuse the gardening device 10 from one growing season to the next.

In the drawing and specification, there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A gardening device for protecting a plant from cold weather damage, the plant having a root system embedded within a quantity of soil and an upper plant portion above the quantity of soil, the gardening device comprising:
   a double wall enclosure having a shape that completely encircles the plant, the double wall enclosure comprising an inner wall spaced from an outer wall and defining an enclosed space there between;
   a fluid filling the enclosed space between the inner and outer walls;
   a heater operatively connected to one of the inner and outer walls in heat conducting relation to the fluid within the enclosed space so as to heat the fluid within the enclosed space.

2. The gardening device according to claim 1 and further comprising a heating member in heat conducting attachment to one of the inner and outer walls of the enclosure for receiving heat by conduction and not fluid flow from the fluid in the space between the inner and outer walls, the heating member extending into the soil adjacent the root system of the plant and conducting heat from the fluid in the space between the inner and outer walls to the soil adjacent the root system.

3. The gardening device according to claim 2 and further comprising a second heater connected to the heating member for imparting additional heat thereto.

4. A gardening device for protecting plants from cold weather damage comprising:
   a double-walled enclosure adapted for filling with fluid and being of a size and shape for completely encircling a plant;
   fluid filling the double-walled enclosure;
   a heater operatively connected to a wall of the enclosure for heating the fluid within the double walled enclosure; and
   a vented lid removably mounted to the top of the enclosure.

5. A method of protecting a plant from cold weather damage, the plant having a root system embedded within a quantity of soil and an upper plant portion above the quantity of soil comprising:
   positioning a double-walled enclosure completely around the plant, the double-walled enclosure having a central cavity containing the plant, an inner wall, an outer wall, and a fluid cavity between the inner wall and outer wall;
   placing a fluid within the fluid cavity;
   heating the fluid within the fluid cavity to impart heat to the central cavity and the plant within the central cavity;
   placing a first portion of a heat conducting member in heat conducting relation with the fluid within the fluid cavity so that the heat conducting member receives heat by conduction and not by fluid flow from the fluid within the fluid cavity;

inserting a second portion of the heat conducting member into the soil adjacent the root system of the plant whereby the heat conducting member will conduct heat from the fluid within the cavity to the soil adjacent the root system of the plant.

6. The method according to claim 5 and further comprising applying heat to the heat conducting member in addition to the heat conducted from the fluid within the fluid cavity whereby the additional heat will be supplied to the soil adjacent the root system of the plant.

7. The method according to claim 5 wherein the step of placing the first portion of the head conducting member in heat conducting relation with the fluid within the fluid cavity further comprises placing the first portion of the heat conducting member in contact with one of the inner and outer walls of the double-walled enclosure whereby heat is conducted from the fluid through the one of the inner and outer walls to the heat conducting member.

8. The gardening device of claim 1 further comprising a vented lid removably mounted to the top of the enclosure.

9. The gardening device of claim 1 further comprising a trellis removably mounted to the double-walled enclosure for supporting a plant growing above the double-walled enclosure.

10. The gardening device of claim 4 further comprising a cover surrounding the trellis.

11. The gardening device of claim 1 further comprising a fluid-circulation pump for circulating fluid within the double-walled enclosure.

12. The method of claim 5 further comprising positioning a vented lid on top of the enclosure.

13. The method of claim 5 further comprising positioning a trellis on top of the enclosure.

14. The method of claim 13 further comprising positioning a cover around the trellis.

15. The gardening device of claim 4 further comprising a trellis removably mounted to the enclosure for supporting a plant growing above the enclosure.

16. The gardening device of claim 15 further comprising a cover surrounding the trellis.

* * * * *